United States Patent [19]
Goldmann et al.

[11] Patent Number: 5,861,464
[45] Date of Patent: Jan. 19, 1999

[54] PROCESS FOR THE AFTER-TREATMENT OF THERMOPLASTIC FLUOROPOLYMERS

[75] Inventors: Gerhard Goldmann, Neuötting; Klaus Hintzer, Kastl; Gernot Löhr; Ludwig Mayer, both of Burgkirchen, all of Germany

[73] Assignee: Dyneon GmbH, Germany

[21] Appl. No.: 770,529

[22] Filed: Dec. 20, 1996

[30] Foreign Application Priority Data

Dec. 21, 1995 [DE] Germany .................. 195 47 909.2

[51] Int. Cl.$^6$ ........................................ C08F 8/30
[52] U.S. Cl. .................... 525/326.4; 525/326.2; 525/378; 528/490; 528/503
[58] Field of Search ................ 525/326.2, 378, 525/326.4; 528/492, 490, 503

[56] References Cited

U.S. PATENT DOCUMENTS

| | | | |
|---|---|---|---|
| 3,085,083 | 4/1963 | Schreyer | 525/326.2 |
| 3,635,926 | 1/1972 | Gresham et al. | 260/87.5 A |
| 3,635,929 | 1/1972 | Franklin et al. | 260/87.5 |
| 3,642,742 | 2/1972 | Carlson | 260/87.5 A |
| 4,599,386 | 7/1986 | Carlson et al. | 525/326.2 |
| 4,743,658 | 5/1988 | Imbalzano et al. | 525/326.4 |
| 4,946,902 | 8/1990 | Bekiarian et al. | 525/326.2 |
| 5,115,038 | 5/1992 | Ihara et al. | 525/326.2 |

*Primary Examiner*—Fred Teskin
*Attorney, Agent, or Firm*—James V. Lilly

[57] ABSTRACT

Labile end groups in fluorinated thermoplastics, in particular carboxyl and acid fluoride groups, are converted into carboxamide groups when the polymer is treated with an aqueous, ammonia-containing solution. The after-treated products have a pale color, do not cause corrosion during processing and can easily be taken from the molds in transfer molding.

9 Claims, No Drawings

PROCESS FOR THE AFTER-TREATMENT OF THERMOPLASTIC FLUOROPOLYMERS

DESCRIPTION

Thermoplastic fluoropolymers are processed largely in the form of granules produced by melt-granulation. Both in the work-up of the polymers in the melt-granulation and also in the further processing of the granules by transfer molding or melt extrusion, the fluoropolymers suffer thermal degradation if they do not have stable perfluorinated end groups.

This degradation occurs first and foremost from the end of the chains, but also by chain rupture. Chain rupture or the lowering of the mean molecular weight can be recognized by the lowering of the melt viscosity. The degradation from the end of the chain can be recognized by the elimination of gaseous decomposition products which during processing can result in bubbles in the products.

Thermally unstable chain ends can be caused by the different methods of preparation. Such end groups can be formed, on the one hand, as a result of the initiator used in the respective case, for example fluorinated peroxides (U.S. Pat. No. 3,642,742) or persulfates (U.S. Pat. No. 3,635,926), with the sulfate ester groups formed first being instantly hydrolyzed to carboxyl groups, on the other hand as a result of the chain transfer agent used in the respective case and, in the case of copolymerization using perfluoro(alkyl vinyl ethers), by chain transfer of the ether radical concerned (U.S. Pat. No. 3,642,742). In the latter case, carbonyl fluoride (—CO—F) groups are formed in the absence of water.

Thus, for example, it is known from U.S. Pat. No. 4,599,386 that in the preparation of copolymers from tetrafluoroethylene and perfluoro(alkyl vinyl ethers), the use of alcohols such as methanol as chain transfer agent leads to methyl ester and carbinol end groups. In addition, —CO—F and —COOH end groups are also formed. These are converted by treatment of the solid polymers with gaseous ammonia or else with ammonia-releasing compounds such as ammonium salts, urea or biuret into more stable carboxamide groups. When ammonia-releasing compounds are used, the treatment is carried out in the melt, when using gaseous ammonia it is carried out at temperatures below the melting point. In this way, the —CO—F and the —COOH groups are converted into carboxamide groups, while the end groups formed as a result of the chain transfer agent methanol are not changed. The elimination of the acid end groups has a stabilizing effect on the thermal stability of the carbinol groups. Furthermore, this treatment significantly reduces the content of extractable fluoride ions. The polymer is as a result largely free of the inorganic salts which interfere in some applications, since their formation in the preparation by the process known from U.S. Pat. No. 3,642,742, namely the polymerization in a perfluorinated solvent or a chlorofluorocarbon using an organic peroxide as initiator, is avoided. However, perfluorinated solvents are expensive and chlorofluoro-carbons are undesired.

Further processes have been described in connection with carboxamide end groups:

U.S. Pat. No. 4,743,658 discloses that in polymerization in aqueous medium the use of ammonium salts as polymerization buffer leads to ammonium carboxylate end groups which in the thermal after-treatment are converted into carboxamide end groups, which are there regarded as labile. The melt-processable copolymers are therefore first after-treated with fluorine and subsequently with an inert gas until the product contains less than 6 —$CF_2CH_2OH$, —$CONH_2$ and —COF end groups per $10^6$ carbon atoms.

U.S. Pat. No. 5,115,038 discloses a process in which a copolymer of tetrafluoroethylene and a perfluoro(alkyl vinyl ether) is treated first with fluorine and subsequently with gaseous ammonia or a gaseous nitrogen-containing compound which can release ammonia. This reduces the content of carboxamide end groups to from 7 to 20 per $10^6$ carbon atoms and carbinol and acid fluoride end groups are virtually eliminated.

It is not known how the formation of unstable end groups could be avoided in the polymerization. Thus, polymerization in nonaqueous media results in formation of acid fluoride end groups by chain transfer.

In the preparation of the copolymers by aqueous free-radical polymerization using water-soluble peroxide initiators, the end groups formed are predominantly carboxyl groups (and in ammoniacal reaction solutions, also carboxamide groups). During the melt-granulation, the acid groups decarboxylate forming a terminal double bond with elimination of hydrogen fluoride and carbon dioxide, and this double bond is oxidized by atmospheric oxygen to form an acid fluoride end group with elimination of carbonyl fluoride. This acid fluoride end group is in turn thermally unstable and can eliminate carbonyl fluoride to again form a double bond, as a result of which the cycle can be repeated. Furthermore, the terminal, double-bonded carbon atom can be eliminated as difluorocarbene which can add on to homologues of fluoro-olefins and can thus also form the very toxic perfluoro-isobutylene.

The gases formed in these decomposition reactions, which have been mentioned here purely by way of example, thus have to be removed by a suitable after-treatment for a variety of reasons. A suitable treatment is degassing at from about 100° to 200° C. while blowing through air or inert gases, but the acid fluoride groups are essentially retained. These groups are hydrolyzed by the moisture content of the air, even during storage, with elimination of the toxic and corrosive hydrogen fluoride. These difficulties, which would naturally occur to an even greater extent during handling and processing, are not acceptable. More effective is degassing in hot water, in which the acid fluoride groups are completely hydrolyzed and the hydrogen fluoride formed remains in the aqueous phase. In addition, in the after-treatment with water, the inorganic salts are largely extracted from the melt granules. However, since the water here has to diffuse into the compact melt granules, i.e. the reaction is diffusion controlled, this method is very time-consuming. Furthermore, high demands are placed on the container material because of the corrosiveness of the hydrogen fluoride.

SUMMARY OF THE INVENTION

It has now been found that an after-treatment of a fluorinated thermoplastic with an aqueous, ammonia-containing solution leads to an unexpectedly high acceleration of the after-treatment and largely suppresses the corrosion of the container used for this purpose. Melt granules treated in this way display no discoloration and have a lower heavy metal content. During further processing, in particular during transfer molding, they cause less corrosion of the components of the mold and display a better demoldability. Metal-contaminated products can show a light pink to brown discoloration which was not found in the products treated according to the invention.

The aqueous after-treatment brings the additional advantage that the salts present in the product as a result of the preparation are extracted. Such salts are, for example, formed from the water-soluble initiators. Salts are also used as auxiliaries in the aqueous polymerization processes, for example as buffers. These salts are relatively nonvolatile and therefore also remain in the product during a thermal aftertreatment. They interfere particularly in demanding fields of use such as electronics.

In further processing, the carboxamide end groups are not sufficiently thermally stable because of the high processing temperatures necessary. Thus, in transfer molding by the customary procedure, about ⅔ of the amide groups, in the case of injection molding virtually all amide groups, are destroyed and replaced by —CO—F or —COOH groups. According to a further embodiment of the invention, final articles, in particular thin-walled moldings, are therefore after-treated. For example, the freshly molded articles can be dipped into an aqueous, ammonia-containing solution or else moldings which have already cooled can be aftertreated at room temperature or higher temperature.

The prevention of corrosion naturally also avoids the previously necessary frequent cleaning of the reactor and the resulting downtime for the plant. The quantitative removal of interfering, labile end groups also leads, as already mentioned, to less corrosion during processing of the polymers and furthermore it is found that during processing by transfer molding the shaped articles can be easily removed from the mold. In addition, the tendency for bubble formation is reduced.

The fluoropolymer to be after-treated can be in the form of melt granules, preferably in a particle size of from about 1 to 3 mm.

DETAILED DESCRIPTION

The after-treatment according to the invention of the fluorinated thermoplastics can be carried out at atmospheric pressure or at superatmospheric pressure. Preference is given to atmospheric pressure or autogenous pressure. The temperature is advantageously in the upper range determined by the pressure, i.e. at atmospheric pressure about 100° C.

In the aqueous ammoniacal after-treatment, virtually only the —CO—F groups are converted into carboxamide groups. Fresh melt granules contain predominantly only —CO—F groups. The conversion of the —CO—F end groups into carboxamide groups proceeds in proportion to the ammonia concentration. This is about 0.1 g of ammonia per liter, preferably at from 0.3 to 250 g per liter (commercial concentrate solution). The ammonia concentration can thus, if desired for specific applications, be employed to set a certain ratio of carboxamide and carboxyl end groups in the product.

For the purposes of the present invention, ammonia-containing solutions also include solutions of compounds which liberate ammonia, for example ammonium salts of weak acids such as ammonium carbonate or carbamate.

Suitable polymers for after-treatment are, first and foremost, perfluorinated thermoplastics such as copolymers containing from 75 to 99% by weight of tetrafluoro-ethylene units plus comonomers selected from the group consisting of perfluoroolefins having from 3 to 8 carbon atoms and perfluoro(alkyl vinyl ethers) having alkyl groups with from 1 to 4 carbon atoms, in particular copolymers of tetrafluoroethylene with hexafluoropropene and preferably perfluoro (n-propyl vinyl ether). The process can also be applied to polymers which comprise, apart from the tetrafluoroethylene, more than one comonomer but preference is given to bipolymers, in particular those comprising perfluoro(alkyl vinyl ether) units. These copolymers preferably contain from 1 to 10% by weight, in particular from 1 to 5% by weight, of ether units and from 10 to 25% by weight of hexafluoropropene units.

The copolymers are prepared by known methods, in particular in an aqueous medium, which methods are, for example, indicated in the abovementioned publications. Those publications also describe the end group determinations.

The following examples illustrate the invention.

EXAMPLE 1

60 g of fresh melt granules of a copolymer comprising 96.5% by weight of tetrafluoroethylene and 3.5% by weight of perfluoro(n-propyl vinyl ether) are placed in a vessel of stainless steel containing 700 ml of a 12.5% strength by weight aqueous ammonia solution. This mixture is gently stirred for 8 hours at room temperature. Subsequently, the product is dried by drawing off the ammonia solution and blowing in dry air. The dry product is completely free of odor, i.e. there is no adhering hydrogen fluoride.

The melted granules used contain 65 —COF groups per $10^6$ carbon atoms and no amide groups. The product obtained according to the invention contains no —COF groups and 67 carboxamide groups per $10^6$ carbon atoms.

In contrast to the data presented in EP-A-457 255, a molding produced from a polymer treated according to the invention contains no bubbles.

Table 1 below gives the results of analogous experiments in which samples were taken after various treatment times in order to estimate the half-life period of the reaction.

In Table 1:

In the column "Examples", S is the starting material and C1 and C2 refer to comparative experiments using water.

"Concentration" refers to the agent, in this case ammonia, in % by weight.

The end groups indicated, in each case based on $10^6$ carbon atoms, are determined by IR absorption in a known manner (EP-B-220 910, page 4; EP-A-457 255, page 4). The discrepancy in the sum of the end groups results from the fact that only isolated, but not associated groups are measured as "—COOH".

"HLP" is the half-life period measured in hours, estimated under the assumption of a first-order reaction.

TABLE 1

| Example | Concentration [% by weight] | Duration [h] | —COF | —COOH | —CONH$_2$ | HLP |
|---|---|---|---|---|---|---|
| S | 0 | 0 | 65 | 42 | 0 | |
| C1 | 0 | 3 | 60 | 42 | 0 | 65 |
| C2 | 0 | 28 | 48 | 47 | 0 | 65 |
| 2 | 25 | 3 | 0 | 25 | 29 | 0.3 |
| 3 | 12.5 | 3 | 25 | 36 | 19 | 2.2 |
| 4 | 2.5 | 3 | 35 | 33 | 10 | 3.3 |

EXAMPLES 5 and 6

The treatment was carried out using a method similar to Example 1, but using an aqueous solution of ammonium carbonate in place of the aqueous ammonia solution. The results are shown in Table 2.

TABLE 2

| Example | Concentration [% by weight] | Duration [h] | —COF | —COOH | —CONH₂ | HLP |
|---|---|---|---|---|---|---|
| 5 | 0.2 | 3 | 60 | 40 | 0 | 26 |
| 6 | 2 | 3 | 45 | 29 | 5 | 7 |

EXAMPLES 7 to 12

The following examples show the possible variations provided by selection of the ammonia concentration and the treatment temperature. The treatment is carried out until the —CO—F groups have virtually disappeared in the IR spectrum.

TABLE 3

| Example | Concentrations [% by weight] | Temperature [°C.] | Duration [h] | —CONH₂ |
|---|---|---|---|---|
| 7 | 0.03 | 90 | 6 | 7 |
| 8 | 0.06 | 90 | 6 | 10 |
| 9 | 0.125 | 90 | 6 | 15 |
| 10 | 2.5 | 25 | 12 | 20 |
| 11 | 10 | 25 | 9 | 29 |
| 12 | 25 | 25 | 3 | 29 |

We claim:

1. A process for the after-treatment of a thermoplastic fluoropolymer, which consists essentially of the steps of:
    providing a melt granulated or a molded thermoplastic fluoropolymer;
    treating the fluoropolymer with an aqueous, ammonia-containing solution at a temperature of from 20° to 130° C.

2. The process as claimed in claim 1, wherein the polymer is treated in the form of melt granules.

3. The process as claimed in claim 1, wherein a molding of the thermoplastic fluoropolymer is after-treated.

4. The process as claimed in claim 1, wherein the ammonia concentration in the treatment solution is ≧0.1 g per liter.

5. The process as claimed in claim 4, wherein the concentration is from 0.3 to 250 g per liter.

6. The process as claimed in claim 1, wherein the copolymer comprises from 90 to 99% by weight of tetrafluoroethylene and from 1 to 10% by weight of a fluorinated olefin or fluorinated ether copolymerizable with tetrafluoroethylene.

7. The process as claimed in claim 1, wherein the treatment of the polymer is carried out until any acidic end groups are transformed into carboxamide groups.

8. A process for the after-treatment of a thermoplastic fluoropolymer, consisting essentially of the steps of
    a) providing melt granules or a molding of a thermoplastic fluoropolymer,
    b) contacting the fluoropolymer with an aqueous, ammonia-containing solution at a temperature of from 20° to 130° C. for a time sufficient to convert reactive end groups to carboxamide groups,
    c) drying said fluoropolymer by drawing off said ammonia-containing solution and blowing in dry air.

9. A method of reducing the salt content of a thermoplastic fluoropolymer, consisting essentially of the steps of
    a) providing melt granules or a molding of a thermoplastic fluoropolymer,
    b) contacting the thermoplastic fluoropolymer with an aqueous, ammonia-containing solution at a temperature of from 20° to 130° C. for a time sufficient to remove salts formed from water-soluble initiators and buffers,
    c) drying said thermoplastic fluoropolymer by drawing off the ammonia-containing solution and blowing in dry air.

* * * * *